Patented Dec. 15, 1931

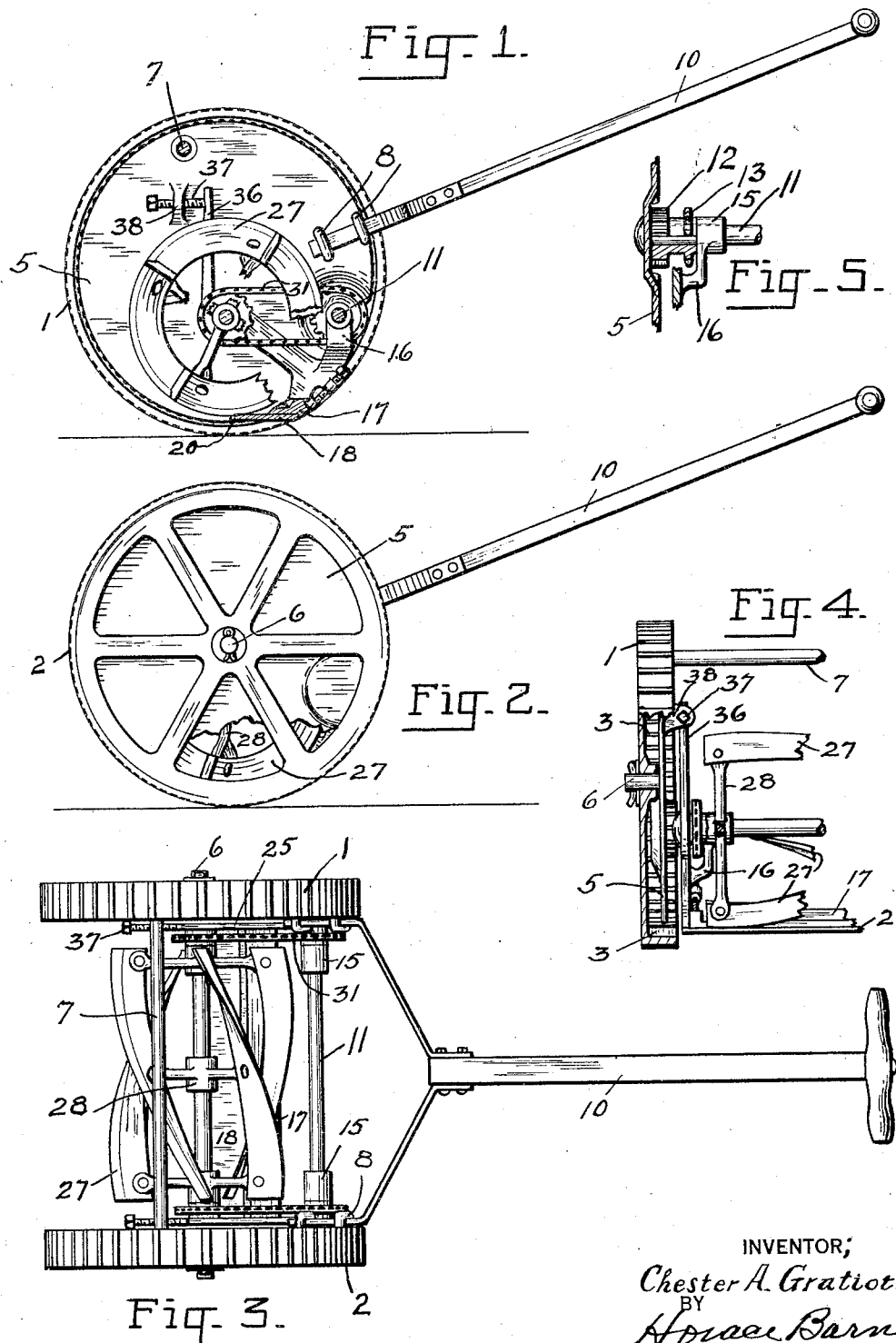

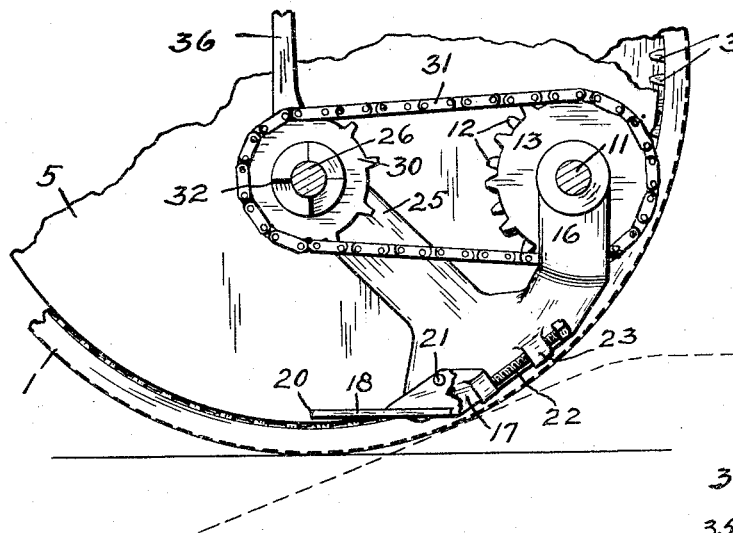
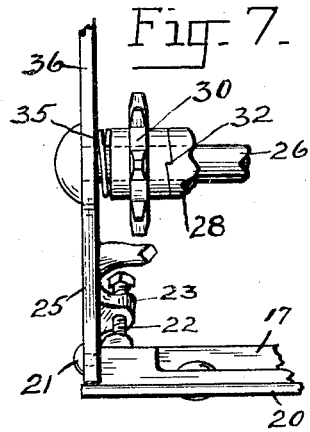
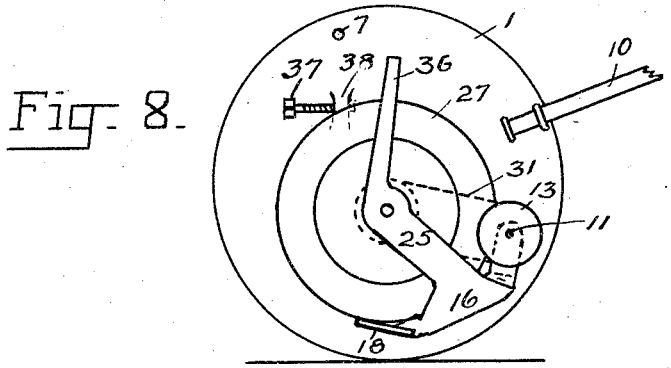
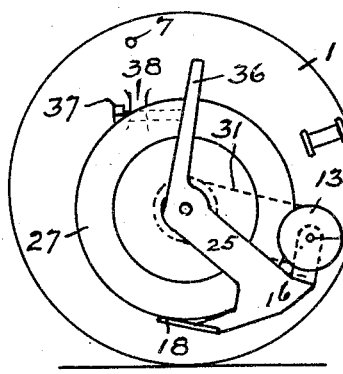
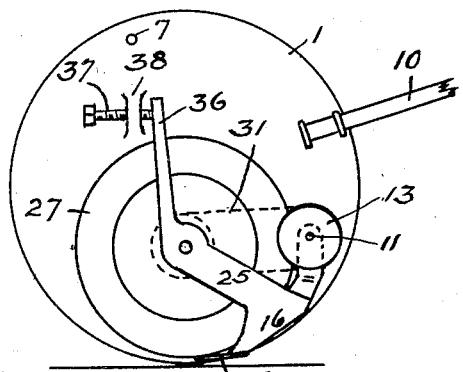

1,836,164

UNITED STATES PATENT OFFICE

CHESTER A. GRATIOT, OF PORTLAND, OREGON, ASSIGNOR, BY MESNE ASSIGNMENTS, TO EVERSHARP LAWNMOWER COMPANY, A CORPORATION OF NEVADA

LAWN MOWER

Application filed December 15, 1927. Serial No. 240,194.

This invention relates to improvements in lawn mowers.

The object of my invention is to provide a lawn mower in which the cutting knives both relatively stationary and rotary are pivotally mounted in hangers, whereby adjustments may be made relative to the length of grass to be cut and the entire cutting assembly will yield to undue obstructions encountered in mowing a lawn.

Other objects and advantages of my invention, and objects relating to details of construction, such as the devices for driving the cutting reel and for relative adjustment of the various parts, will be fully apparent in the course of the detailed description to follow.

The accompanying drawings illustrate by way of example a preferred form of my invention, in which:

Figure 1 is a view in vertical cross section of my improved lawn mower.

Fig. 2 is a view in side elevation of the same with a portion thereof broken away.

Fig. 3 is a top plan view of the lawn mower.

Fig. 4 is a fragmentary view in front elevation of the lawn mower with a portion broken away.

Fig. 5 is a detail view in cross section illustrating the drive mechanism.

Fig. 6 is a fragmentary detail view of the hanger device upon which the cutting blades are mounted and the driving mechanism therefor.

Fig. 7 is a fragmentary view in plan illustrating the clutch device on the shaft of the cutting reel.

Figs. 8, 9, and 10 are diagrammatic views similar to Fig. 1 showing various positions of the operative parts of the invention.

Referring to said views, the reference numerals 1 and 2 indicate the traction wheels of my improved lawn mower which are of the usual recessed construction having internal gear teeth 3. A circular plate 5 is inserted within the recess of each wheel to which the wheels are rotatably connected on axles 6 at their common centers. The plates 5 are rigidly connected together by a transverse bar 7 adjacent their upper edges, and spaced apertured lugs 8 are integrally connected to said plates toward their rear edges within which a handle bar 10 is connected in the usual manner.

A spindle 11 is rigidly mounted at its opposite ends in the plates 5 adjacent the rear edges thereof upon opposite ends of which tooth pinions 12 are rotatably mounted in engagement, respectively, with the gear teeth 3 upon the inner side of the plate. Integrally connected to each said pinion is a sprocket wheel 13. A hanger frame is pivotally mounted upon the spindle 11 through bosses 15 in each end thereof inwardly adjacent to the pinion member 12. Integral arms 16 extend downwardly from said bosses to support a transverse bar 17 spaced upwardly from the lower rim of the traction wheels to clear the ground.

A ledger blade 18 is rigidly connected upon the under side of said bar having a forwardly extending cutting edge 20. The transverse bar 17 is pivotally mounted, as at 21, in the arms 16 with which adjustment screws 22 are engaged at each end thereof to vary the inclination of the blade 18, said screw being mounted in lugs 23 apertured and internally screw threaded. Extending upwardly and forwardly from the lower end of each of the arms 16 are brackets 25 affording bearings for the opposite ends of a tie rod 26 upon which the rotary cutter blades 27 are rotatably mounted by means of spiders 28.

Sprocket wheels 30 are rotatably mounted on the tie rod 26 in line with the sprocket wheels 13 over which drive chains 31 are connected and engage by ratchet teeth 32 with opposing teeth upon the hub of the adjacent spider 28 providing a clutch to drive the cutting reel in the forward movements of the machine. Said clutch may be yieldably engaged to drive the cutting reel in its operative direction by a spring 35 interposed between the sprocket wheel and the respective bracket 25. When the machine is actuated rearwardly the clutch-parts will slip, thus preventing the actuation of the cutting-reel in reverse directions and avoiding the use of a clutch usually incorporated in the pinion corresponding to the pinion 12 as found in other makes of machines.

An arm 36 extends upwardly from each of the brackets 25 engageable with a screw 37 threaded through a lug 38 in each of the side plates 5 whereby the hanger frame is adjusted as a unit in its relation with the ground while free to swing upwardly away from the adjustable stop provided by the screws 37.

In operation when my improved lawn mower is actuated along the ground the rotation of the wheels 1 and 2 will, through the constant engagement of the pinions 12 with the gear teeth 3, actuate the sprocket wheels 13 and chain 31 to rotate the cutting reel with which the ledger blade 18 is in shearing engagement. The cutting reel and the ledger blade being mounted in the hanger frame in relatively fixed position and swinging as a unit about the spindle 11 occasionally require adjustments, such as to determine the length of grass to be cut, which are made by manipulating the screw 37 to raise or lower the cutting edge 20 of the ledger blade relative to the ground.

From the foregoing description, taken in connection with the accompanying drawings, the advantages of the construction and application of my improved lawn mower will be readily apparent; but, while I have described the principle of operation of the invention, together with the structure I now consider the best embodiment thereof, it will be readily understood that the devices shown are merely illustrative and that such changes may be made therein as will lie within the scope of the following claims.

Having described my invention, what I claim, is:

1. A lawn mower, consisting in a pair of traction wheels formed with internal gear teeth, a fixed plate upon which said wheels are journaled, respectively, a toothed pinion in mesh with the gear teeth of each said wheel, a sprocket wheel integral with each said pinion, a pair of hanger arms pivotally mounted axially with said pinions, a ledger blade adjustably mounted in said hanger arms, a pair of brackets each integral with the respective hanger arm, a cutting reel rotatably mounted in said brackets, a sprocket wheel operatively connected to said cutting reel, a chain operatively connecting said sprocket wheels, a stop arm extending upwardly from each said bracket, and an adjustable stop engaging the forward side of said stop arm to adjust the height of said cutter reel.

2. A lawn mower, consisting in a pair of plates in fixed spaced relation, a traction wheel rotatably mounted concentrically upon each said plate and each formed with internal gear teeth, a spindle secured at its opposite ends in said plates, a pinion and sprocket wheel integrally connected and rotatably mounted on said spindle, said pinion being in mesh with the gear teeth of the respective traction wheel, a hanger frame pivotally mounted on said spindle, a cutting-reel rotative in said frame; a ledger blade adjustably mounted in said frame in shearing engagement with said cutting-reel, a sprocket wheel operatively connected to said cutting reel, a chain connecting said sprocket wheel to drive said cutting reel, and means to maintain said hanger frame at adjusted positions.

3. A lawn mower, consisting in a pair of plates in fixed spaced relation, a traction wheel rotatably mounted concentrically upon each said plate and each formed with internal gear teeth, a spindle secured at its opposite ends in said plates, a pinion and sprocket wheel integrally connected and rotatably mounted on said spindle, said pinion being in mesh with the gear teeth of the respective traction wheel, a hanger frame pivotally mounted on said spindle, a cutting-reel rotative in said frame; a ledger blade adjustably mounted in said frame in shearing engagement with said cutting-reel, a sprocket wheel operatively connected to said cutting reel, a chain connecting said sprocket wheel to drive said cutting reel, an arm extending rigidly from said hanger frame, and an adjustable stop for said arm limiting the movement of the frame in forward and downward directions.

CHESTER A. GRATIOT.